US011156295B2

(12) United States Patent
Ting et al.

(10) Patent No.: US 11,156,295 B2
(45) Date of Patent: Oct. 26, 2021

(54) ULTRAHIGH PRESSURE COMPACT VALVE WITH THROTTLING CAPABILITY

(71) Applicant: PRESSURE BIOSCIENCES, INC., South Easton, MA (US)

(72) Inventors: Edmund Y. Ting, Kent, WA (US); Alexander Lazarev, Lexington, MA (US); Jun Ma, Northborough, MA (US)

(73) Assignee: PRESSURE BIOSCIENCES, INC., South Easton, MA (US)

( * ) Notice: Subject to any disclaimer, the term of this patent is extended or adjusted under 35 U.S.C. 154(b) by 118 days.

(21) Appl. No.: 15/758,975

(22) PCT Filed: Sep. 8, 2016

(86) PCT No.: PCT/US2016/050717
§ 371 (c)(1),
(2) Date: Mar. 9, 2018

(87) PCT Pub. No.: WO2017/044590
PCT Pub. Date: Mar. 16, 2017

(65) Prior Publication Data
US 2019/0085982 A1    Mar. 21, 2019

Related U.S. Application Data

(60) Provisional application No. 62/217,634, filed on Sep. 11, 2015.

(51) Int. Cl.
*F16K 1/12*        (2006.01)
*F16K 1/38*        (2006.01)
(Continued)

(52) U.S. Cl.
CPC .............. *F16K 1/12* (2013.01); *F16K 1/14* (2013.01); *F16K 1/38* (2013.01); *F16K 3/24* (2013.01);
(Continued)

(58) Field of Classification Search
CPC .. F16K 1/12; F16K 1/1438; F16K 3/24; F16K 31/047; F16K 31/163; F16K 31/10; F16K 31/62; F16K 37/005
See application file for complete search history.

(56) References Cited

U.S. PATENT DOCUMENTS 2,052,246 A      8/1936  Ray
3,143,131 A *    8/1964  Spencer ............... F16K 31/10
                                                    137/269

(Continued)

FOREIGN PATENT DOCUMENTS

CN    206409720 U    8/2017
GB       1424371 A   2/1976
(Continued)

OTHER PUBLICATIONS

Diels, A. M. J., Wuytack, E. Y., and Michiels, C. W., "Modelling inactivation of *Staphylococcus aureus* and Yersinia enterocolitica by high-pressure homogenisation at different temperatures", International Journal of Food Microbiology, 87, pp. 55-62 (2003); DOI: 10.1016/S0168-1605(03)00050-3.

(Continued)

*Primary Examiner* — Eric Keasel
(74) *Attorney, Agent, or Firm* — Lando & Anastasi, LLP

(57) ABSTRACT

A high pressure valve includes a lever and a variable force generator for facilitating control of opening and closing the valve at high pressures. The high pressure valve includes a housing having a chamber providing fluid communication between a first port and a second port, a pin movable within the chamber between an open position and a closed position. A first end of a lever is coupled to the pin and a second end of the lever is coupled to a variable force generator. The lever pivots about a pivot point. A controller coupled to the variable force generator is configured to adjust a force applied to the second end of the lever by the variable force (Continued)

generator to control the movement of the pin between the open position and the closed position.

21 Claims, 10 Drawing Sheets

(51) Int. Cl.
*F16K 3/24* (2006.01)
*F16K 1/14* (2006.01)
*F16K 31/62* (2006.01)
*F16K 37/00* (2006.01)
*F16K 31/04* (2006.01)
*F16K 31/163* (2006.01)
*F16K 31/10* (2006.01)

(52) U.S. Cl.
CPC ............ *F16K 31/047* (2013.01); *F16K 31/10* (2013.01); *F16K 31/163* (2013.01); *F16K 31/62* (2013.01); *F16K 37/005* (2013.01)

(56) References Cited

U.S. PATENT DOCUMENTS

| | | | |
|---|---|---|---|
| 3,667,722 A | 6/1972 | Katz | |
| 3,733,050 A | 5/1973 | Gordon | |
| 4,776,256 A | 10/1988 | Gath et al. | |
| 4,862,788 A | 9/1989 | Bauman | |
| 5,232,726 A | 8/1993 | Clark et al. | |
| 5,346,172 A * | 9/1994 | Gonsior | F16K 31/165 251/243 |
| 5,704,553 A | 1/1998 | Wieczorek et al. | |
| 6,120,732 A | 9/2000 | Toledo et al. | |
| 6,701,744 B1 | 3/2004 | Yajima et al. | |
| 8,201,716 B2 * | 6/2012 | Chastine | B05C 5/001 137/875 |
| 9,192,190 B2 | 11/2015 | Guamis Lopez et al. | |
| 10,352,468 B2 * | 7/2019 | Easter | E21B 21/08 |
| 2009/0120515 A1 | 5/2009 | Ohtani et al. | |
| 2010/0147877 A1 | 6/2010 | Chastine et al. | |
| 2013/0052359 A1 | 2/2013 | Ahmadi et al. | |
| 2013/0243644 A1 | 9/2013 | Guamis Lopez et al. | |
| 2015/0006091 A1 | 1/2015 | Schoonover | |

FOREIGN PATENT DOCUMENTS

| | | |
|---|---|---|
| JP | H1255701 A | 10/1989 |
| JP | H10184933 A | 7/1998 |
| JP | 2005349387 A | 12/2005 |
| JP | 2009115271 A | 5/2009 |

OTHER PUBLICATIONS

Poliseli-Scopel, F. H., Hernandez-Herrero, M., Guamis, B., and Ferragut, V., "Comparison of ultra high pressure homogenization and conventional thermal treatments on the microbiological, physical and chemical quality of soymilk", LWT—Food Science and Technology, 46, pp. 42-48 (2012); DOI: 10.1016/j.lwt.2011.11.004.

Pereda, J., Ferragut, V., Quevedo, J. M., Guamis, B., and Trujillo, A. J., "Heat damage evaluation in ultra-high pressure homogenized milk", Food Hydrocolloids, 23, pp. 1974-1979 (2009); DOI: 10.1016/j.foodhyd.2009.02.010.

Asano, Y., Ihara, K., Mori, T., Mizota, T., Iwatsuki, K., and Sotoyama, K., "Flash Sterilization System using a High-pressure Homogenizer", Nippon Shokuhin Kagaku Kogaku Kaishi, vol. 47, No. 2, pp. 130-135 (2000).

Cruz, N., Capellas, M., Hernandez, M., Trujillo, A.J., Guamis, B., and Ferragut, V., "Ultra high pressure homogenization of soymilk: Microbiological, physicochemical and microstructural characteristics", Food Research International, 40, pp. 725-732 (2007); DOI: 10.1016/j.foodres.2007.01.003.

Serra, M., Trujillo, A. J., Jaramillo, P. D., Guamis, B., and Ferragut, V., "Ultra-High Pressure Homogenization-Induced Changes in Skim Milk: Impact on Acid Coagulation Properties", Journal of Diary Research, pp. 69-75 (2008); DOI: 10.1017/S0022029907003032.

Zamora i Viladomiu, Anna, "Ultra-high pressure homogenisation of milk: effects on cheese-making" Doctoral Thesis, Universitat Autònoma de Barcelona (2009).

* cited by examiner

ULTRAHIGH PRESSURE COMPACT VALVE WITH THROTTLING CAPABILITY

CROSS-REFERENCE TO RELATED APPLICATIONS

This application is a U.S. national phase application, and claims the benefit of priority under 35 U.S.C. § 371, of PCT/US2016/050717, titled ULTRAHIGH PRESSURE COMPACT VALVE WITH THROTTLING CAPABILITY and filed on Sep. 8, 2016, which in turn claims the benefit of priority to U.S. Provisional Patent Application 62/217,634, entitled ULTRAHIGH PRESSURE COMPACT VALVE WITH THROTTLING CAPABILITY, filed Sep. 11, 2015, the entire contents of which are incorporated herein by reference for all purposes.

STATEMENT REGARDING FEDERALLY SPONSORED RESEARCH OR DEVELOPMENT

This invention was made with government support under Award No. R44HG007136 awarded by the National Human Genome Research Institute of the National Institutes of Health. The government has certain rights in the invention.

FIELD OF THE DISCLOSURE

The present disclosure is related to the control of high pressure liquid flow in a compact high pressure valve where the fluid flow needs to be stopped, started or adjusted.

BACKGROUND OF THE DISCLOSURE

High pressure (for example, greater than 20,000 psi) applications are growing in many areas of science and industry. The need to stop and start flow is an essential control requirement for many applications. These applications may involve flow at ml/min or gal per second. High pressure on-off valves typically are devices which force a pin into a hole to stop flow. An example of a simple valve would be a manually operated valve 1000 where a screw 1010 is turned to drive a pin 1020 into a hole (seat) 1030 to stop flow, as shown in FIG. 1.

In order to remotely operate a valve, the force on the pin is typically generated by an actuator in line with the pin. Various commercial high pressure valves use combinations of spring, air and hydraulic force generators. Mechanical spring and pneumatic (air) pressure control of the valve is common. A typical valve can use a spring to close the valve and air pressure to counter act the spring force to open the valve.

The force needed to close a valve is directly proportional to the cross section of the pin in the seat. For example a seat/pin contact diameter of 0.100 inch at 100,000 psi would require a closing force of at least 785 lbs. Working with a common air pressure supply of 90 psi, an air piston inside diameter of at least 3.5 inches would be needed. Factoring in friction and a factor of safety, an air piston of at least 4 to 5 inches in diameter may be selected. For many processes, such physically large valves are impractical. In addition, some robotic applications require the use of compact valve due to space constraints. Benchtop equipment requires compact valves which can fit inside instrument cabinets.

In order to overcome the size problem with air pistons, higher pressure hydraulic (for example 2,000 psi) fluids can be used. This however adds more complex equipment (a hydraulic pump and hydraulic control valves) and involves a messy hydraulic fluid. This approach is also not suitable for benchtop of small scale applications as hydraulic power is typically inconvenient.

There is a need for a compact high pressure valve system that is physically small and operated by actuators at low forces, and preferably by small direct electric control actuators.

Furthermore, new high pressure applications are being developed which require more than on-off function. These applications require the precise control of flow under either constant flow rate or constant pressure conditions.

For example, a fixed rpm crank case pump as used in a High Performance Liquid Chromatography (HPLC) system would represent a constant displacement pump delivering constant flow rate. This pump will supply a constant flow from zero pressure up to the design pressure limit of the pump. The pressure achieved depends on the restriction places into the flow path of the pump. Other constant flow rate pumps include mechanical crank driven positive displacement homogenizers. Some of these pumps are capable of driving flow at pressures up to 40,000 psi.

A different pump type is the pressure intensifier pump. The intensifier pump outputs constant pressure rather than flow rate. It will supply a constant pressure from no flow up to the design flow limit of the pump. For example, a pneumatic powered intensifier based homogenizer is a constant pressure pump.

SUMMARY OF THE DISCLOSURE

One aspect of the present disclosure is directed to a high pressure valve that comprises a housing having a chamber, a first port configured to allow fluid to flow therethrough, a second port configured to allow fluid to flow therethrough, the chamber providing fluid communication between the first port and the second port; a pin movable within the chamber between an open position in which the first port and the second port are in fluid communication and a closed position in which the first port and the second port are not in fluid communication; a lever having a first end coupled to the pin and a second end, the lever having a pivot point that is pivotally secured to the housing; a variable force generator connected to the second end of the lever and configured to move the pin between the open position and the closed position; and a controller coupled to the variable force generator, the controller being configured to adjust a force applied to the second end of the lever by the variable force generator to control the movement of the pin between the opened position and the closed position.

In some embodiments, the pin is biased to the open position, and the variable force generator is configured to cause the force at the first end of the lever to be sufficient to move the pin to the closed position.

In some embodiments, the pin is biased to the open position by one of air pressure and a spring.

In some embodiments, a first sensor configured to sense a first pressure at the first port, and a second sensor configured to sense a second pressure at the second port, the controller being configured to adjust the force based on a difference between the first pressure and the second pressure.

In some embodiments, the high pressure valve further comprises a seat secured to the housing, wherein the pin is configured to engage the seat to adjust fluid communication between the first port and the second port, the seat being configured to sealingly engage the pin when the pin is in the closed position.

In some embodiments, the variable force generator is an air piston acted on by an external controlled air pressure.

In some embodiments, the variable force generator is an electromechanical device.

In some embodiments, the electromechanical device is one of a voice coil actuator and a stepper motor.

In some embodiments, the pin engages a ceramic ball that is configured to sealingly engage a seat secured to the housing when the pin is in the closed position.

In some embodiments, the high pressure valve is configured to operate at a pressure of at least 20,000 psi as measured in the chamber.

In some embodiments, the pivot point is located closer to the first end of the lever than to the second end of the lever.

In some embodiments, the lever is configured so that a force at the first end of the lever is at least five times the force applied to the second end of the lever by the variable force generator.

Another aspect of the present disclosure is directed to a high pressure valve that comprises a first housing having a chamber and a first port configured to allow fluid to flow therethrough; a second housing having a second port configured to allow fluid to flow therethrough; a pin movable within the chamber of the first housing between an open position in which the first port and second port are in fluid communication and a closed position in which the first port and the second port are not in fluid communication; a third housing having a lever, the lever having a first end coupled to the pin and a second end, the lever having a pivot point that is pivotally secured to the third housing, the first housing, the second housing, and the third housing being securable together; a variable force generator connected to the second end of the lever and configured to move the pin between the open position and the closed position; and a controller coupled to the variable force generator, the controller being configured to adjust a force applied to the second end of the lever by the variable force generator to control the movement of the pin between the opened position and the closed position.

In some embodiments, the pin is biased to the open position, and the variable force generator is configured to cause the force at the first end of the lever to be sufficient to move the pin to the closed position.

In some embodiments, the pin is biased to the open position by one of air pressure and a spring.

In some embodiments, the high pressure valve further comprises a first sensor configured to sense a first pressure at the first port, and a second sensor configured to sense a second pressure at the second port, the controller being configured to adjust the force based on a difference between the first pressure and the second pressure.

In some embodiments, the high pressure valve further comprises a seat secured to the second housing, wherein the pin is configured to engage the seat to adjust fluid communication between the first port and the second port, the seat being configured to sealingly engage the pin when the pin is in the closed position.

In some embodiments, the variable force generator is an air piston acted on by an external controlled air pressure.

In some embodiments, the variable force generator is an electromechanical device.

In some embodiments, the electromechanical device is one of: a voice coil actuator and a stepper motor.

In some embodiments, the pin engages a ceramic ball that is configured to sealingly engage a seat secured to the second housing when the pin is in the closed position.

In some embodiments, the high pressure valve is configured to operate at a pressure of at least 20,000 psi as measured in the chamber.

In some embodiments, the pivot point is located closer to the first end of the lever than to the second end of the lever.

In some embodiments, the lever is configured so that a force at the first end of the lever is at least five times the force applied to the second end of the lever by the variable force generator.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This present disclosure relates to the design of a compact ultrahigh pressure valve where the operating pressure is greater than 20,000 psi and where liquid flow needs to be stopped, started or controlled at a defined differential pressure to generate high liquid shear stress. High liquid shear stress is typically used to dissipate pressure energy, homogenize, mix, fracture liquid suspended materials, or generate rapid temperature increases in the liquid.

More particularly, the present disclosure relates to a compact valve design utilizing a lever to reduce the force generator needed to operate the valve.

This present disclosure comprises a high pressure valve incorporating a lever amplified force generator with a force multiplier effect of at least five to one. The amplified force allows a valve to operate at higher valve pressure with less actuation force. This means that for a pneumatically operated valve, a smaller diameter air piston would be needed.

Since the air piston is the largest physical component, this is an important reduction in the size of the valve.

The modular construction of the valve of the present disclosure allows different combinations of components to be installed to achieve different valve function. For example valve components can be installed strictly for on-off applications or for controlled flow operation.

For both the constant flow rate and constant pressure types of pumps, the present disclosure provides a valve which can establish open flow, stop flow, as well as control flow dynamically at defined differential pressure. In a constant pressure pump system, this valve allows the maximum flow rate possible before the maximum pump power is reached. In a constant flow rate pump system, this valve allows the maximum pressure possible before the maximum power is reached.

Figure 1:
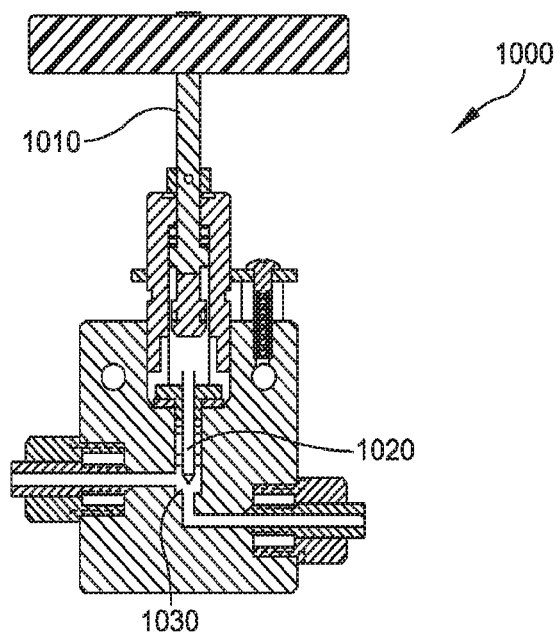
FIG. 1 is a cross-sectional view of a manually operated valve.
Figure 2:
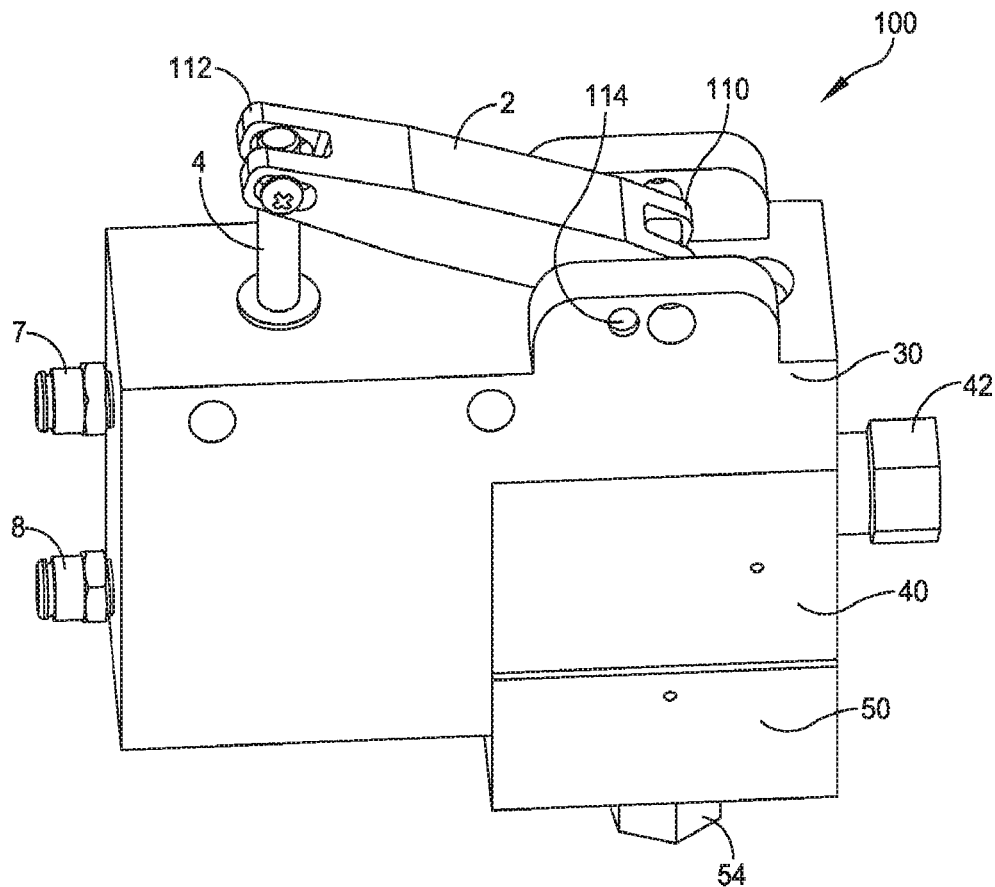
FIG. 2 is perspective view of an ultrahigh pressure compact valve of an embodiment of the present disclosure showing a modular valve design.

FIG. 2 shows a high pressure valve assembly, generally indicated at 100, of an embodiment of the present disclosure. The valve assembly 100 includes a first housing 40, a second housing 50, and a third housing 30. The third housing 30 incorporates an internal air cylinder and mounting positions, including a pivot support, for a lever 2. The third housing 30 is connected to the high pressure containing housings (the first housing 40 and the second housing 50). The first housing 40 and the second housing 50 can also be referred to as the high pressure portion of the valve assembly 100. The first housing 40, the second housing 50, and the third housing 30 are secured together, as discussed in further detail herein, to form the high pressure valve assembly 100.

Figure 3:
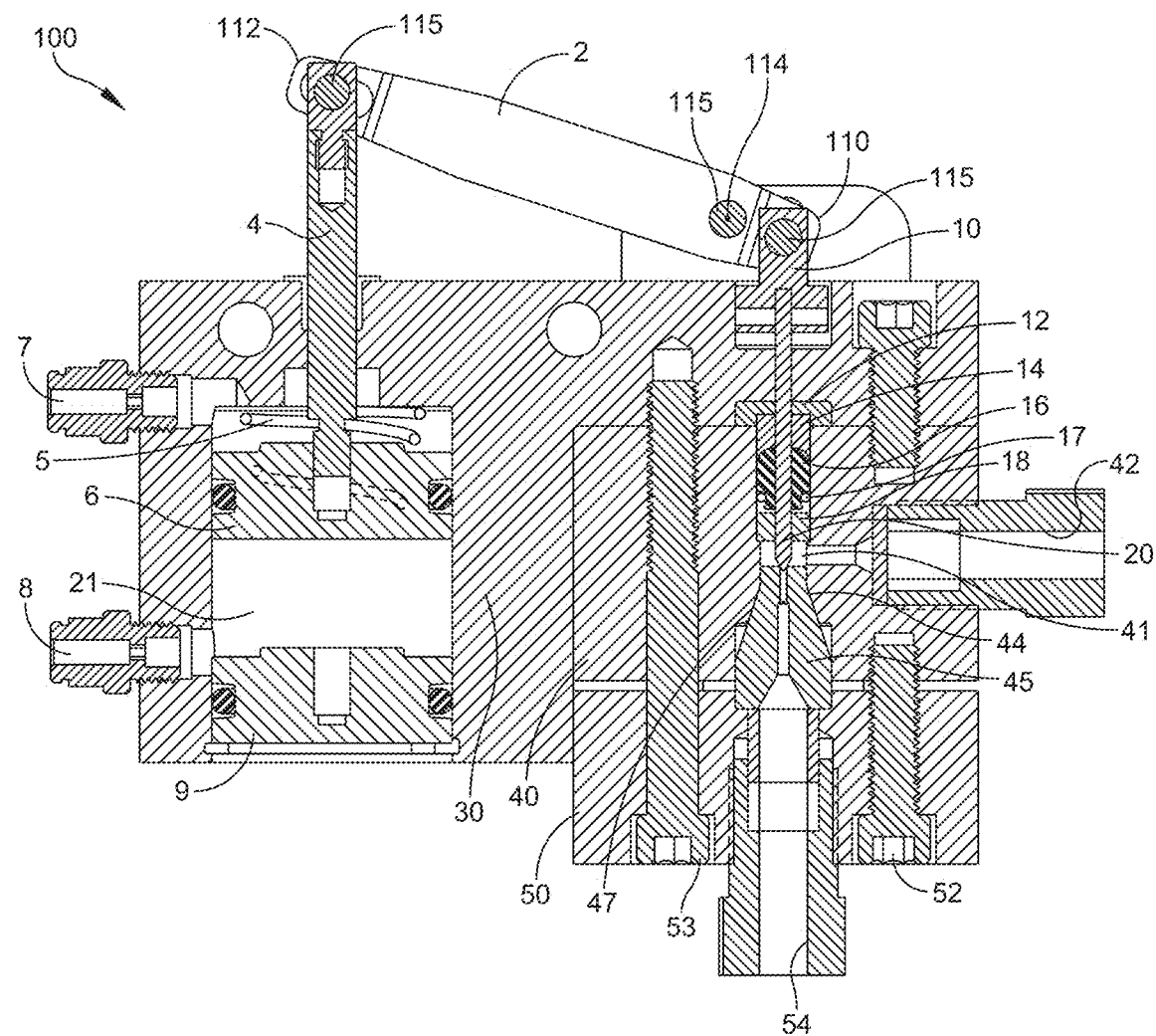
FIG. 3 is a cross-sectional view of the valve shown in FIG. 2.

FIG. 3 shows that the first housing 40 has a chamber 41 and a first port (or first gland) 42 that is in fluid communication with the chamber 41 so that it allows fluid to flow through the first port 42 to the chamber 41. The second housing 50 has a second port (or second gland) 54 configured to allow fluid to flow from the chamber 41 and through the second port 54 when the valve assembly 100 is open. To selectively open and close the valve assembly 100, a pin 20 is movable within the chamber 41 of the first housing 40 between an open position in which the first port 42 and second port 54 are in fluid communication and a closed position in which the first port 42 and the second port 54 are not in fluid communication. FIG. 3 shows the pin 20 in the closed position.

The first port 42 and the second port 54 can connect the valve assembly 100 to external tubing or devices for storing or collecting a fluid either before the fluid has been processed or after the fluid has been processed. A material to be processed can be provided from a source (not shown) to the first gland 42.

The high pressure valve assembly 100 includes a seat 45 secured to the second housing 40. The pin 20 is configured to selectively engage the seat 45 to adjust fluid communication between the first port 42 and the second port 54. With the embodiment of the valve assembly 100, the seat 45 is configured to sealingly engage the pin 20 when the pin 20 is in the closed position. A gap is defined between the pin 20 and the seat 45 when the pin 20 is in an open position.

The pin 20 is guided by a back-up ring (BUR) 14, which is supported by a back-up ring support 12. Below the back-up ring 14, the pin 20 is also passed through the inner diameter of a high pressure seal 16 incorporating an elastomeric o-ring 17. Below the high pressure seal 16 and toward the lower end of the pin 20, the pin 20 travels through an inner diameter of a metal guide bushing 18 as the pin is moved up and down by pivoting of the lever 2.

The seat 45 is held in place by securing the second housing 50 to the first housing 40 using machine screw 52 and by securing the second housing 50 to the third housing 30 using machine screws 53. The seat 45 is sealed against the upper block (first housing) 40 at a circumferential contact point 44 by high metal to metal contact stress as a result of a small angular difference between the conical seat 45 and conical receptacle 47 in the block 40 and the force of the screws 52. In one example, the cone angle of the frustoconical central portion of the seat 45 is 36 degrees when measured from the vertical axis of the seat 45, and the cone angle of the conical receptacle 47 in the first housing 40 is 40 degrees when measured from the vertical axis of the first housing 40. The screws 52, 53 are torqued to between 7 and 10 foot-pounds to generate sufficient contact stress to seal the chamber 41 of the valve assembly 100 at the circumferential contact point 44.

At high pressures in the chamber 41, high pressure fluid may leak through the clearance between the pin 20 and the metal guide bushing 18. Such high pressures cause the relatively soft high pressure seal 16 to push against the back-up ring 14. To form a seal around the pin 20 to prevent housing leakage, the high pressure seal 16 has a spherical end geometry on its upper end in FIG. 3. The spherical end of the high pressure seal 16 is supported by the back-up ring 14 with a matching concave geometry on its lower face in FIG. 3 and a low (<0.001 inch) clearance fit between the inner diameter of the back-up ring and the pin 20. The spherical end geometry of the high pressure seal 16 and the concave geometry of the back-up ring 14 enable expansion of the outer diameter edge of the back-up ring 14 to reduce the extrusion gap on the outer diameter of the back-up ring 14. The curved shape also focuses the high pressure seal 16 into the interface between the pin 20 and the back-up ring 14 to seal the area around the upper end of the pin 20 when the high pressure seal 16 is exposed to high pressure. The convex shape of the high pressure seal 16 and the concave shape of the back-up ring 14 cause the outer diameter walls of the concave portion of the back-up ring 14 to flare outward, while the high pressure seal 16 simultaneously deforms inwardly at its upper end to seal any clearance gap between the pin 20 and the back-up ring 14.

In some embodiments, the end geometry of the high pressure seal 16 can be tapered or curved, rather than perfectly spherical.

In some embodiments, the upper end of the high pressure seal 16 is a convex shape that is not spherical.

In the embodiment of FIGS. 2 and 3, the pin 20 is made from high strength stainless steel, typically 440C. The seat 45 is made from 17-4 ph stainless steel, the seal is made from UHMWPE combined with an elastomeric o-ring, and the back-up ring is a bearing grade nickel bronze. A 17-4 ph stainless steel back-up ring support 12 is used to transfer the high load to the actuation body. The pressure containing housings (the first housing 40 and the second housing 50) are made from 17-5 ph stainless steel. The third housing 30 is made from 6061-T6 aluminum. The back-up ring support 12 material is selected to prevent deformation of relatively weak aluminum of the third housing 30 under high loading of the back-up ring 14.

The lever 2 and connecting pins 115 are also made from high strength stainless steels. One connecting pin 115 links the lever 2 to the third housing 30 at the pivot point 114. Another connecting pin 115 links the lever 2 to the pin holder 10. Another connecting pin 115 links the lever 2 to the shaft 4.

To move the pin 20, the third housing 30 has a lever 2, which has a first end 110 coupled to the pin 20 and a second end 112 coupled to the variable force generator (for example by coupling the second end 112 to the shaft 4). The lever 2 has a pivot point 114 that is pivotally secured to the third housing 30. In FIGS. 2 and 3, the pivot point 114 is located closer to the first end 110 of the lever 2 than to the second end 112 of the lever 2. This provides a mechanical advantage so that the force applied by the first end 110 of the lever 2 to the pin 20 is greater than the force applied by the piston 6 and piston shaft 4 to the second end 112 of the lever 2.

In some embodiments, the high pressure valve assembly 100 is configured so that a force at the first end 110 of the lever 2 is at least five times the force applied to the second end 112 of the lever 2 by the variable force generator.

The high pressure valve assembly 100 can be configured to operate at a pressure of at least 20,000 psi as measured in the chamber 41.

A variable force generator is connected to the second end 112 of the lever 2 and is configured to move the pin 20 between the open position and the closed position. It is possible to use various types of force generators, such as those discussed herein.

In the embodiment of FIG. 3, an air cylinder 21 with a piston 6 is used as a variable force generator. To move the pin 20 to the closed position, air pressure is applied to the internal air cylinder 21 via port 8 and acts on the piston 6 and causes the piston 6 to move relative to the base 9 at the lower end of the air cylinder 21. The piston shaft 4 pushes upwardly on the second end 112 of the lever 2, which pivots about the pivot point 114, so the first end 110 of the lever 2 acts on a pin holder 10 that is coupled to the pin 20, thereby moving the pin ultimately to the closed position.

In some embodiments of the high pressure valve assembly 100, the pin 20 is biased to the open position by air pressure and/or a spring 5. FIG. 3 shows the high pressure valve assembly 100 in which the pin 20 is biased to the open position by the spring 5. The variable force generator is configured to cause the force at the first end 110 of the lever 2 to be sufficient to move the pin 20 to the closed position. When the air pressure is removed from the port 8, the internal spring 5 will pull the second end 112 of the lever 2 downwardly and open the valve by causing the first end 110 of the lever to pull the pin 20 away from the valve seat 45.

In some embodiments, alternatively or in addition to a spring bias, direct air pressure can be applied through port 7 to the top of the piston to bias the valve assembly 100 to an open position or to selectively open the valve assembly by causing the piston 6 to move downwardly, and to pull the second end 112 of the lever 2 downwardly.

Figure 4:
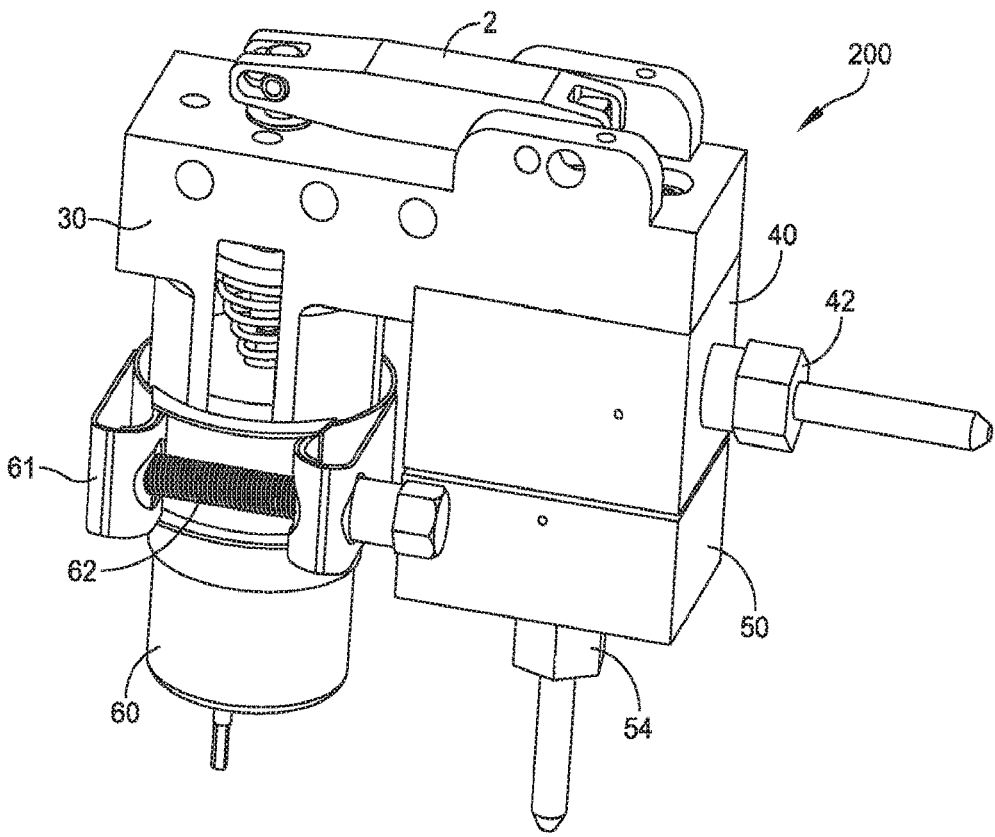
FIG. 4 is a perspective view of an ultrahigh pressure compact valve of another embodiment of the present disclosure, which is operated with a voice coil actuator.
Figure 5:
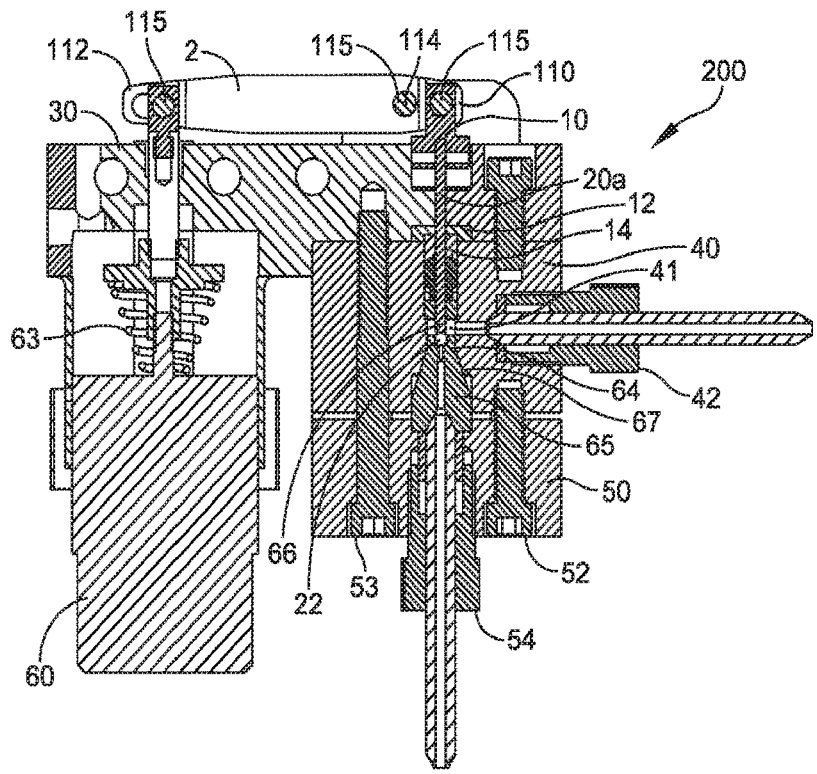
FIG. 5 is a cross-sectional view of the valve shown in FIG. 4.
Figure 6:
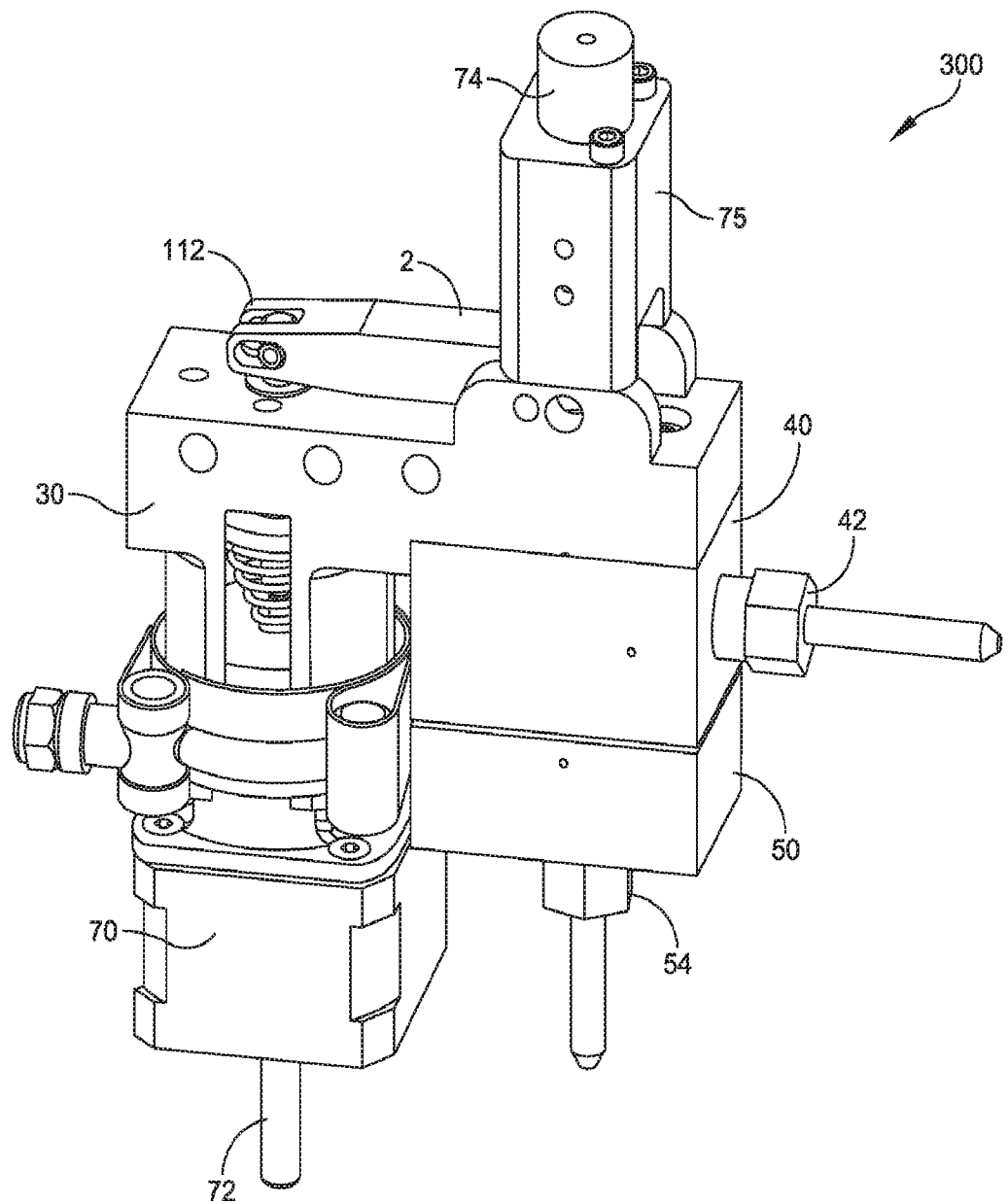
FIG. 6 is a perspective view of an ultrahigh pressure compact valve of another embodiment of the present disclosure, which is operated with a stepper motor and monitored with a displacement sensor.

In various embodiments of the present disclosure, the source of actuation force can be changed to alternative sources. In FIG. 3, the variable force generator is an air piston acted on by an external controlled air pressure. In FIGS. 4-6, the variable force generator is an electromechanical device.

The present disclosure allows the use of force generators with high controllability. Conventional air cylinders are limited in their ability to precisely control force due to friction of the piston seal. Friction of the piston seal limits the ability of the air cylinder to control forces. The limit of control is set by the static friction of the seal. A low or no friction force generator allows higher resolution control of the valve. For example, the use of a voice coil actuator (VCA), for example as discussed in the present disclosure, allows more precise control. Since a VCA has no internal seal, very low friction can be achieved. The VCA can also allow more rapid variations in control force. This can be used to rapidly pulse the valve for certain applications such as high pressure fatigue testing of components. The use of the lever allows the use of a lower power VCA. Without the force amplification lever 2, a much larger VCA would be needed, increasing the cost and size.

Alternatively, other low force producing devices can be used to operate the valve assembly; for example, a stepper motor and lead screw with or without feedback can be used to operate a simple on-off valve. In addition, when used with precision position monitoring, control flow rates can be achieved by precisely setting pin position. In FIG. 6, the variable force generator is a stepper motor.

FIGS. 4 and 5 show a valve assembly, generally indicated at 200, of another embodiment of the present disclosure in which the variable force generator is a voice coil actuator (VCA) 60. The third housing 30 and the lever 2 are the same as the third housing 30 and the lever 2 in the embodiment 100 of FIG. 3, except in the embodiment 200, the third housing 30 is configured to support the VCA instead of an air cylinder 21. In the embodiment 200, the VCA 60 is held in place on the third housing 30 simply by an adjustable clamp 61 having a threaded bolt 62. The VCA 60 having near zero friction allows a precisely controlled force to act on the pin 20. The force applied on the second end 112 of the lever 2 by the VCA 60 is controlled by digital or analog circuits and software based on data from pressure sensors both in front and after the valve. This allows very rapid closed loop control of the differential pressure. Such sensors are discussed in further detail in relation to FIG. 8.

To reduce the duty cycle of the electromechanical actuator such as the VCA 60, a bias spring 63 may be used to supply a constant force to the lever 2. The bias spring 63 reduces the power consumption of the VCA 60.

In some embodiments, for example the valve assembly 200 shown in FIG. 5, a pin 20a includes an end 66 to engage a ceramic ball 22 that is configured to sealingly engage a seat 65, which is secured between the first housing 40 and the second housing 50, when the pin 20a and ball 22 are in the closed position. In such embodiments, the previous pin 20 and seat 45 of FIGS. 2 and 3 are replaced by another form of closing such as a pin 20a that engages a ball 22 in a recessed well on the upper end of the valve seat 65. By controlling the force on the ball 22 by the lower end 66 of the pin 20a, a controlled pressure drop can be produced in the valve as measured by the pressure at the first gland 42 relative to the pressure at the second gland 54. A pressure drop would produce liquid shear stress and fluid heating. For example liquid shear stress would be used to rupture (fragment) cellular material, such as tissue, blood cells, or DNA suspended in the liquid. In order to reduce erosion, the ball 22 can be made from a tough ceramic such as transformation-toughened Zirconia (TTZ). A ceramic ball 22 has better resistance than a metal pin to the constant erosion forces.

At relatively higher pressure drops, the increase in liquid temperature could be significant to achieve specific effects. For example, at sufficiently high pressure, very rapid liquid heating can be produced for purposes such as microbiological inactivation and liquid food sterilization.

In FIG. 5, the seat 65 is held in place by securing the second housing 50 to the first housing 40 using screw 52, and by securing the second housing 50 to the third housing 30 using screws 53. The seat 65 is sealed against the upper block (first housing) 40 at a circumferential contact point 64 by high metal to metal contact stress as a result of a small angular difference between the conical seat and conical receptacle in the block 40 and the force of the screws 52, 53. In one example, the cone angle of the frustoconical central portion of the seat 65 is 36 degrees when measured from the vertical axis of the seat 65, and the cone angle of the conical receptacle 67 in the first housing 40 is 40 degrees when measured from the vertical axis of the first housing 40. The screws 52 are torqued to between 7 and 10 foot-pounds to generate sufficient contact stress to seal the chamber 41 of the valve at the circumferential contact point 64.

At high pressures in the chamber 41, high pressure fluid may leak through the clearance between the pin 20a and the metal guide bushing 18. Such high pressures can cause the relatively soft high pressure seal 16 to push against the back-up ring 14. To form a seal around the pin 20a to prevent housing leakage, the high pressure seal 16 has a spherical end geometry on its upper end in FIG. 5. The spherical end of the high pressure seal 16 is supported by the back-up ring 14 with a matching concave geometry on its lower face in FIG. 5 and a low (<0.001 inch) clearance fit between the inner diameter of the back-up ring and the pin 20a. The spherical end geometry of the high pressure seal 16 enables expansion of the outer diameter edge of the back-up ring 14 to reduce the extrusion gap on the outer diameter of the back-up ring 14. The curved shape focuses the high pressure seal 16 into the interface between the pin 20a and the back-up ring 14 to seal the area around the upper end of the pin 20a.

The convex shape of the high pressure seal 16 and the concave shape of the back-up ring 14 cause the outer diameter walls of the concave portion of the back-up ring 14 to flare outward, while the high pressure seal 16 simultaneously deforms inwardly at its upper end to seal any clearance gap between the pin 20a and the back-up ring 14.

In some embodiments, the end geometry of the high pressure seal 16 can be tapered or curved, rather than perfectly spherical.

In some embodiments, the upper end of the high pressure seal 16 is a convex shape that is not spherical.

In another embodiment, a valve assembly, generally indicated at 300, which is shown in FIG. 6, includes a stepper motor actuator 70 with a lead screw 72 that can be used as the variable force generator to generate the force needed to operate the valve by pivoting the lever 2. The use of the lever 2 increases the positional accuracy of the actuator 70.

In the embodiment of the valve assembly 300 shown in FIG. 6, a sensitive external position sensor 74 is shown. The sensitive external position sensor 74 is used to measure the exact position of the pin 20 for feedback control. For example, the position sensor 74 can be used to sense the position of the pin itself, the first end 110 of the lever 2, or the pin holder 10. The sensor 74 is secured to a sensor housing 75, which is secured to the third housing 30. It is also understood that position information can also be obtained from built in sensors built into the stepper motor 70 in the embodiment of FIG. 6 or built into the VCA 60 in the embodiment of FIGS. 4 and 5.

Figure 7:
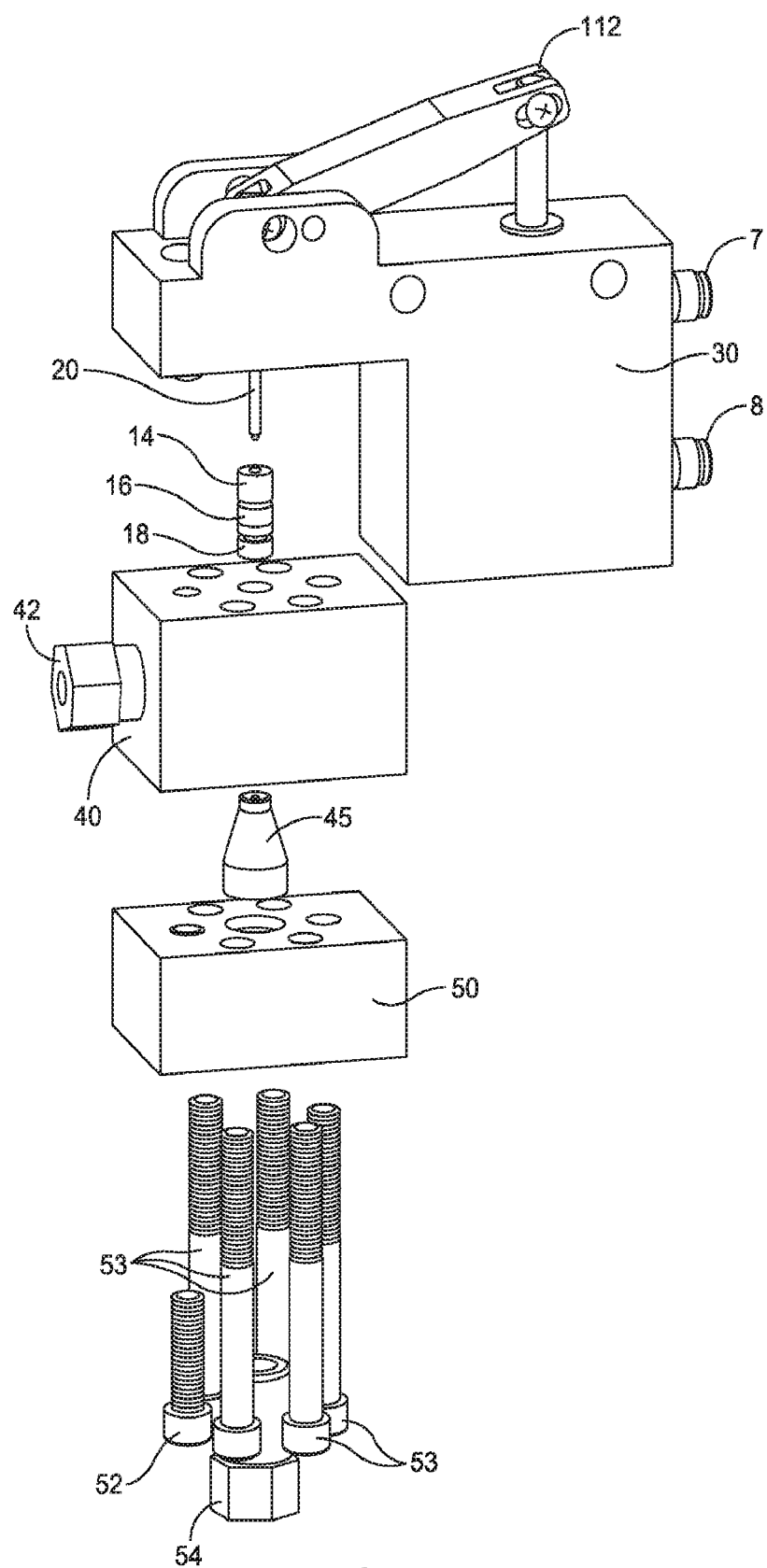
FIG. 7 is an exploded perspective view of the valve shown in FIG. 2.

In each of the embodiments of the valve assembly shown in FIGS. 2-7, the first housing 40, the second housing 50, and the third housing 30 are securable together. FIG. 3 shows that screws 53 secure the third housing 30 to the second housing 50. Another screw 52 secures the first housing 40 to the second housing 50. FIG. 7 shows an exploded view of the high pressure valve of FIGS. 2 and 3. Screws 52 extend through the first housing 40 and second housing 50, and are received in the third housing 30 to secure the first housing 40, second housing 50, and third housing 30 in fixed spatial relation.

Figure 8:
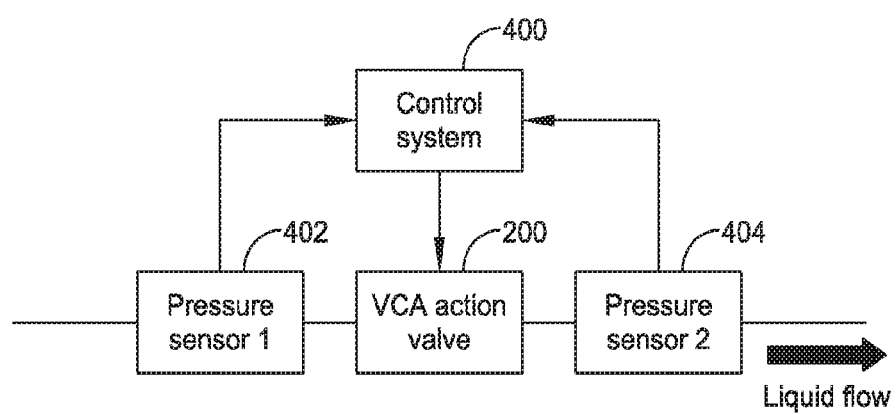
FIG. 8 is a block diagram of a control system.

To control the variable force generator, a controller (a control system) 400 is coupled to the variable force generator. FIG. 8 shows a controller 400 coupled to the VCA 60 of the VCA action valve embodiment 200. The controller 400 is configured to adjust a force applied to the second end 112 of the lever 2 by the variable force generator, which is the VCA 60 in the valve embodiment 200, to control the movement of the pin 20a between the opened position and the closed position. The controller 400 operates based on pressure information provided by a first sensor 402 and a second sensor 404. In one embodiment, the first sensor 402 is configured to sense a first pressure at the first port 42, and the second sensor 404 is configured to sense a second pressure at the second port 54. The controller 400 is configured to adjust the force applied to the second end 112 of the lever 2 based on a difference between the first pressure and the second pressure.

In order to control the flow of a product between the first gland 42 and the second gland 54, the amount of force applied to the lever 2 can be varied by either adjusting air pressure or by adjusting the electrical power to the actuator (such as the VCA). Pressure transducers can be used on both inlet and outlet sides of the valve to measure differential pressure. FIG. 8 shows that the first pressure sensor 402 is upstream of the second pressure sensor 404. If the downstream pressure is essentially atmospheric, only one pressure transducer will be needed. Similarly, temperature sensors can be used both at the inlet (for example, at the first port 42) and at the outlet (for example, at the second port 54) of the valve to measure differential temperature, which is an indicator of energy dissipation.

Similarly, pressure sensors can be used both at the inlet (for example, at the first port 42) and at the outlet (for example, at the second port 54) of the valve to measure differential pressure, which is an indicator of energy dissipation.

The control system 400 can be used to control the embodiment 100 of FIGS. 2 and 3, the valve assembly 200 of FIGS. 4 and 5, or the valve assembly 300 of FIG. 6.

The control system 400 can be configured to cause the variable force generator to allow, prevent, or vary the flow between the first port 42 and the second port 54. The control system 400 can be configured to cause the variable force generator to effect a constant gap between the pin 20 and the valve seat 45. The control system 400 can also or alternatively be configured to cause the variable force generator to effect a constant differential pressure between the first port 42 and the second port 54.

In FIG. 8, the control system 400 includes a processor, a memory component, a power supply, and instructions stored on the memory component that instruct the processor of the control system 400 to provide an actuation signal to the voice coil actuator 60 of the voice coil action valve assembly 400.

In some embodiments, the third housing 30 can be independently provided to a user of the first housing 40 and the second housing 50. Because of the modular construction, the third housing 30 can be used with various components that include a valve that can be sealed by a pin.

Although the drawings illustrate a first housing 40, a second housing 50, and a third housing 30 that are separately formed, in other embodiments it is possible to provide a housing that does not have this modular structure. For example, the second housing 50 and the third housing 30 could be integrally formed in some embodiments.

As used herein, a variable force generator can be a piston, a voice coil actuator, a lead screw, or another device for applying a load.

Additional methods to precisely control liquid flow at very low flow rates and high pressure can be used in the embodiments of high pressure valve assemblies of the present disclosure.

Given a constant pressure source (such as a pressure intensifier pump), the ability to control flow rate depends on the ability to adjust the opening through which the fluid passes. Using a fixed opening like a circular opening (an orifice), at a specific pressure, the flow rate is fixed. Using a pin on a hole, in an idealized case, as the opening gap is adjusted, the flow rate is adjusted. The smaller the opening, the lower the flow rate.

Given a constant flow source (such as a constant displacement pump, like a high performance liquid chromatography (HPLC) pump), the ability to control pressure depends on the ability to adjust the opening through which the fluid passes. In an idealized case, the smaller the opening, the higher the pressure.

Methods to adjust the opening through which the fluid flows can vary from pressing a simple metal pin onto a metal hole, to holding a ceramic ball against a metal hole. Additional methods are possible. Harder materials like ceramics can have better wear resistance than metal when subjected to very high energy fluid flow associated with high pressure pumps. High energy flow typically generates cavitation and other erosive forces which can quickly wear softer materials, such as steel. The higher the pressure differential across the opening, the greater the erosion forces. The ability to control flow or pressure is typically referred to as throttling.

Figure 9:
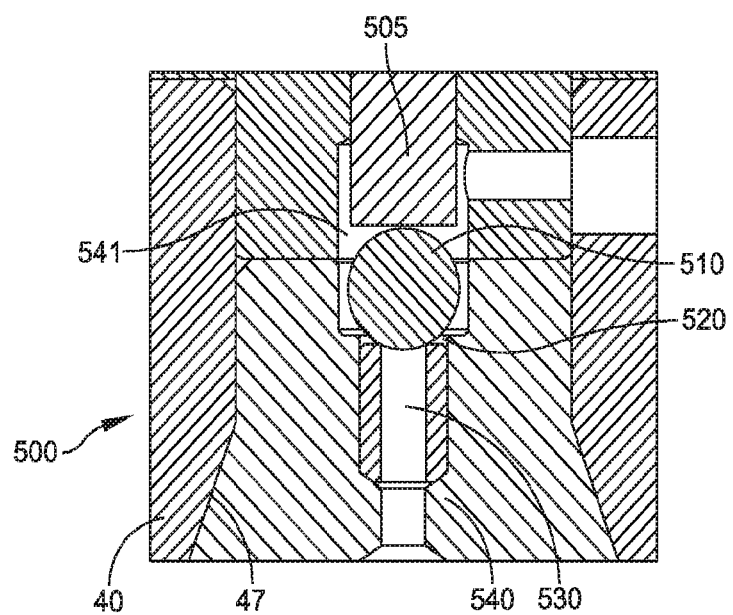
FIG. 9 is another cross-sectional view of an embodiment of a throttling assembly.
Figure 10:
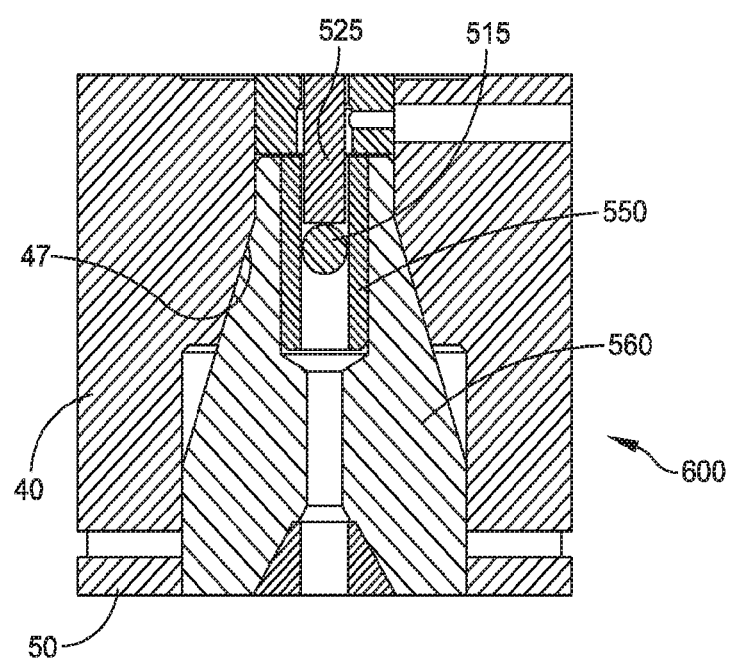
FIG. 10 is another cross sectional view of another embodiment of a throttling assembly.
Figure 11:
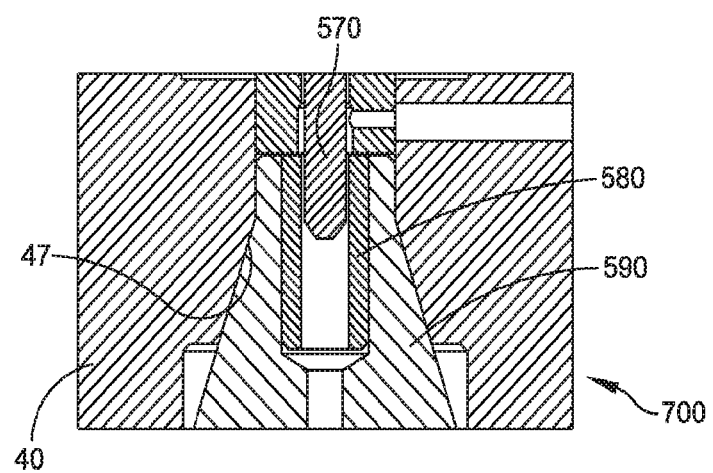
FIG. 11 is a cross-sectional view of another embodiment of a throttling assembly.

The throttling assembly 500 of FIG. 9, the throttling assembly 600 of FIG. 10, and the throttling assembly 700 of FIG. 11 can each be used in place of the seat 45 and the pin 20 of FIG. 3 and the seat 65, the pin 20a, and the ball 22 of FIG. 5.

In one embodiment of a throttling assembly 500, shown in FIG. 9, a ceramic ball 510 is positioned in chamber 541 and selectively engages a ceramic insert 530 to seal a ceramic circular opening on the ceramic insert 530 by adjusting a gap 520 between the ceramic ball 510 and the ceramic insert 530. In one implementation of the throttling assembly 500, the metal seat 45 of FIG. 3 is replaced with a metal insert holder 540 containing the ceramic insert 530, and the pin 20 of FIG. 3 is replaced with a pin 505 to engage a ceramic ball 510. The contact surfaces between the ceramic insert 530 and ball 510 are both ceramic material, and thus, fluid erosion of the ceramic insert 530 and ball 510 can be prevented or reduced. In order to secure the ceramic insert 530 in the metal insert holder 540, the ceramic insert 530 is installed with an interference fit between the inner diameter of an insert receiver defined in the metal seat and an outer diameter of the ceramic insert 530 created by pressure fit (or heat shrink). The contact stress between the outer diameter of the ceramic insert 530 and the metal insert holder 540 is preferably at least 1.5 times the magnitude of the maximum fluid pressure anticipated. This high compressive force, imparts a high compressive stress on the inner diameter of the ceramic insert 530 which further reduces erosion damage of the ceramic insert 530.

In another embodiment of a throttling assembly 600, shown in FIG. 10, the ceramic ball 515 is positioned inside a ceramic tube insert 550 that has a tapered inner surface. Generally, for very fine control of the fluid passage opening, a precise gap is required between the ceramic ball 515 (or other obstruction) and a surface on the seat. For the ball on seat approach, movement of the ball by a very small distance away from the seat will greatly increase the gap between the ball and the seat. For very fine control of flow, in the throttling assembly 600, the ceramic ball 515 is axially movable within a tapered ceramic tube insert 550. If the taper of the inner surface of the tapered ceramic tube insert 550 is a low angle, movement of the ceramic ball 515 along the longitudinal axis of the tapered ceramic tube insert 550 will only gradually increase the gap between the outer surface of the ceramic ball 515 and the inner surface of the tapered ceramic tube insert 550. This improves fine fluid flow control as a greater movement of the ceramic ball 515 is needed to change the gap by a given amount. The tapered ceramic tube insert 550 is held inside a metal insert holder 560 by an interference fit. The interference fit creates a compressive residual stress which further prevents erosion damage to the inside surface of the tapered ceramic tube insert 550. The insert holder 560 is used to establish a seal with the first housing 40. When no loads are applied to the ceramic tube insert 550, the ceramic tube insert 550 can have a geometry that does not have a tapered inner surface. In such an example, a taper of the inner surface of the tapered ceramic tube insert 550 is created by non-uniform compression of the insert holder 560 on the ceramic tube insert 550. By providing compressive stress on the ceramic tube insert 550, a gradual taper on the inner surface of the ceramic tube insert 550 can be provided that would otherwise be difficult to form by machining. For example, a controlled taper of 0.00001 inches per inch or greater can be produced by adjusting the compressive stress surrounding the ceramic tube insert 550. For example compression of a straight tube at its midsection can cause an inner surface of the tube to have an "hour-glass" shape. Linear movement of the ceramic ball 515 within this tapered ceramic tube insert 550 will throttle the flow to a precise level. For example, a pin 525 can be used to cause the ceramic ball 515 to approach the narrowed region of the "hour-glass" shape from one direction to throttle the flow.

In another embodiment of a throttling assembly 700, shown in FIG. 11, a ceramic rod 570 is axially movable within a tapered ceramic tube 580 that has a tapered inner surface. The tapered ceramic tube 580 is held inside a metal insert holder 590 by an interference fit. In certain situations, when the pressure drop desired in a valve should not be instantaneous, a ceramic rod 570 can be used in place of a ceramic ball as the obstruction within the tapered ceramic tube 580. The opening created is that of an annular clearance gap with a length many times as great as the annular clearance gap. This creates a flow that remains laminar within the annular clearance gap and avoids cavitation within this annular clearance gap. This is particularly important when attempting to fragment substances with long molecular chains, such as deoxyribonucleic acid (DNA). In other situations, the use of the ceramic rod 570, as compared to a ball, can simply yield longer valve life as the fluid energy is dissipated over a larger zone and causes less erosion.

Figure 12A:
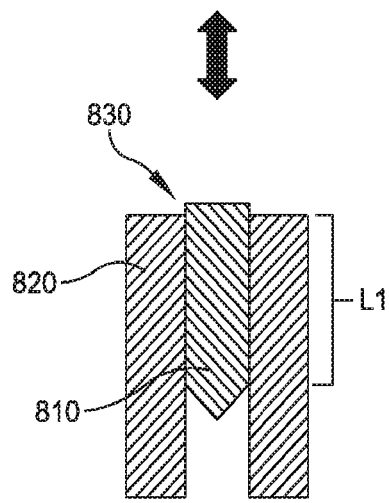
FIG. 12A is a cross-sectional view of an embodiment of an insert of a throttling assembly.
Figure 12B:
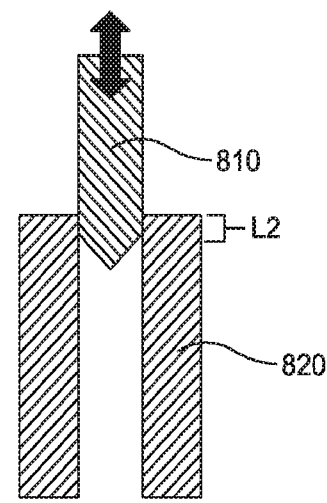
FIG. 12B is a cross-sectional view of the embodiment of FIG. 12A.

Referring to FIGS. 12A and 12B, in another embodiment of a throttling assembly, a ceramic rod 810 is axially movable within a ceramic tube 820 that has a constant inner diameter. For the rod 810 having an outer diameter of 1.985 mm and the ceramic tube 820 having an internal diameter of 2.000 mm, a clearance 830 of 7.5 µm can be provided between the ceramic rod 810 and the ceramic tube 820. In certain situations, a length of the ceramic rod inside the ceramic tube can be used to control flow. As the length of the clearance gap is shortened from L1 to L2 between FIGS. 12A and 12B, there is less obstruction and the flow can be thus controlled. This concept can also be combined with the throttling assembly 700 of FIG. 11.

Different methods can be used to generate an axially non-uniform compression on the ceramic insert 530 of FIG. 9, the ceramic tube insert 550 of FIG. 10, and the ceramic tube insert 580 of FIG. 11. These include a direct interference fit between the ceramic tube insert and the respective insert holder. In one example, the out diameter of the ceramic tube insert is 0.002 inch greater than the inner diameter of the insert receiver defined in the insert holder. When the ceramic tube insert is lowered into the insert receiver defined in the insert holder, the interference fit will cause the inner diameter of the inserted ceramic tube insert to be contracted by 0.0008 inch at the lower end of the ceramic tube insert. Alternative methods include application of compressive stress on the insert holder during installation into the valve. For example, because of a difference in taper between an outer frustoconical surface of the insert holder 540 and a receptacle 47 in the first housing 40, advancing the insert holder 540 into the receptacle 47 or retracting the insert holder 540 from the receptacle can adjust the compressive force of the contact between those tapered surfaces at the circumferential contact point 44. Similarly, because of a difference in taper between an outer frustoconical surface of the insert holder 560 and a receptacle 47 in the first housing 40, advancing the insert holder 560 into the receptacle 47 or retracting the insert holder 560 from the receptacle can adjust the compressive force of the contact between those tapered surfaces at the circumferential contact point 44. Similarly, because of a difference in taper between an outer frustoconical surface of an insert holder 590 and a receptacle 47 in the first housing 40, advancing the insert holder 590 into the receptacle 47 or retracting the insert holder 590 from the receptacle can adjust the compressive force of the contact between those tapered surfaces at the circumferential contact point 44. The compressive force on the outer surface of the insert holder is transferred to the ceramic tube insert mounted within the insert holder, causing deformation of the inner surface of the ceramic tube insert so that the inner surface is tapered along the length of the ceramic tube insert.

Embodiments are not limited in their application to the details of construction and the arrangement of components set forth in the following description or illustrated in the drawings. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A valve comprising:
 a housing having a chamber, a first port configured to allow fluid to flow therethrough, a second port configured to allow fluid to flow therethrough, the chamber providing fluid communication between the first port and the second port;
 a pin movable within the chamber between an open position in which the first port and the second port are in fluid communication and a closed position in which the first port and the second port are not in fluid communication;
 a lever having a first end coupled to the pin and a second end, the lever having a pivot point that is pivotally secured to the housing;
 a variable force generator connected to the second end of the lever and configured to move the pin between the open position and the closed position;
 a controller coupled to the variable force generator, the controller being configured to adjust a force applied to the second end of the lever by the variable force generator to control the movement of the pin between the open position and the closed position;
 a first sensor configured to sense a first pressure at the first port; and
 a second sensor configured to sense a second pressure at the second port,
 the controller being configured to adjust the force based on a difference between the first pressure and the second pressure.

2. The valve of claim 1, wherein the pin is biased to the open position, and the variable force generator is configured to cause a force at the first end of the lever to be sufficient to move the pin to the closed position.

3. The valve of claim 1, wherein the chamber and the valve are configured to operate at a pressure of 20,000 psi.

4. The valve of claim 1, wherein the pivot point is located closer to the first end of the lever than to the second end of the lever.

5. The valve of claim 1, further comprising a seat secured to the housing, wherein the pin is configured to engage the seat to adjust fluid communication between the first port and the second port, the seat being configured to sealingly engage the pin when the pin is in the closed position.

6. The valve of claim 1, wherein the lever is configured so that a force at the first end of the lever is five times the force applied to the second end of the lever by the variable force generator.

7. The valve of claim 1, wherein the variable force generator is an electromechanical device.

8. The valve of claim 1, wherein the pin is guided by a back-up ring, which is supported by a backup ring support, and wherein the pin is also passed through the inner diameter of a high pressure seal incorporating an elastomeric o-ring.

9. The valve of claim 1, wherein the pin engages a ceramic ball that is configured to sealingly engage a seat secured to the housing when the pin is in the closed position.

10. The valve of claim 9, wherein the seat is a metal insert holder containing a ceramic insert.

11. The valve of claim 9, wherein the ceramic ball is positioned inside a ceramic tube insert that has a tapered inner surface, wherein the ceramic ball is axially movable within the ceramic tube insert.

12. A valve comprising:
 a housing having a chamber, a first port configured to allow fluid to flow therethrough, a second port configured to allow fluid to flow therethrough, the chamber providing fluid communication between the first port and the second port;
 a pin movable within the chamber between an open position in which the first port and the second port are in fluid communication and a closed position in which the first port and the second port are not in fluid communication;

a lever having a first end coupled to the pin and a second end, the lever having a pivot point that is pivotally secured to the housing;

a variable force generator connected to the second end of the lever and configured to move the pin between the open position and the closed position; and a controller coupled to the variable force generator, the controller being configured to adjust a force applied to the second end of the lever by the variable force generator to control the movement of the pin between the open position and the closed position, wherein the variable force generator is an electromechanical device, and wherein the electromechanical device is one of a voice coil actuator or a stepper motor.

13. A valve comprising:

a first housing having a chamber and a first port configured to allow fluid to flow therethrough;

a second housing having a second port configured to allow fluid to flow therethrough;

a pin movable within the chamber of the first housing between an open position in which the first port and second port are in fluid communication and a closed position in which the first port and the second port are not in fluid communication;

a third housing having a lever, the lever having a first end coupled to the pin and a second end, the lever having a pivot point that is pivotally secured to the third housing, the first housing, the second housing, and the third housing being securable together;

a variable force generator connected to the second end of the lever and configured to move the pin between the open position and the closed position;

a controller coupled to the variable force generator, the controller being configured to adjust a force applied to the second end of the lever by the variable force generator to control the movement of the pin between the open position and the closed position;

a first sensor configured to sense a first pressure at the first port; and a second sensor configured to sense a second pressure at the second port, the controller being configured to adjust the force based on a difference between the first pressure and the second pressure.

14. The valve of claim 13, wherein the pin is biased to the open position, and the variable force generator is configured to cause a force at the first end of the lever to be sufficient to move the pin to the closed position.

15. The valve of claim 13, wherein the pin engages a ceramic ball that is configured to sealingly engage a seat secured to the second housing when the pin is in the closed position.

16. The valve of claim 13, wherein the chamber and the valve are configured to operate at a pressure of 20,000 psi.

17. The valve of claim 13, further comprising a seat secured to the second housing, wherein the pin is configured to engage the seat to adjust fluid communication between the first port and the second port, the seat being configured to sealingly engage the pin when the pin is in the closed position.

18. The valve of claim 13, wherein the pivot point is located closer to the first end of the lever than to the second end of the lever.

19. The valve of claim 13, wherein the variable force generator is an electromechanical device.

20. The valve of claim 13, wherein the lever is configured so that a force at the first end of the lever is five times the force applied to the second end of the lever by the variable force generator.

21. A valve comprising:

a first housing having a chamber and a first port configured to allow fluid to flow therethrough;

a second housing having a second port configured to allow fluid to flow therethrough;

a pin movable within the chamber of the first housing between an open position in which the first port and second port are in fluid communication and a closed position in which the first port and the second port are not in fluid communication;

a third housing having a lever, the lever having a first end coupled to the pin and a second end, the lever having a pivot point that is pivotally secured to the third housing, the first housing, the second housing, and the third housing being securable together;

a variable force generator connected to the second end of the lever and configured to move the pin between the open position and the closed position; and a controller coupled to the variable force generator, the controller being configured to adjust a force applied to the second end of the lever by the variable force generator to control the movement of the pin between the open position and the closed position, wherein the variable force generator is an electromechanical device, and wherein the electromechanical device is one of a voice coil actuator or a stepper motor.

* * * * *